United States Patent
Kim et al.

(10) Patent No.: US 9,926,010 B2
(45) Date of Patent: Mar. 27, 2018

(54) APPARATUS AND METHOD FOR MANIPULATING IN-VEHICLE DEVICES USING STEERING WHEEL

(71) Applicant: HYUNDAI MOTOR COMPANY, Seoul (KR)

(72) Inventors: Jin Kwon Kim, Suwon-si (KR); Byoung Joon Lee, Suwon-si (KR); Seong Sook Ryu, Seoul (KR); Ho Choul Jung, Suwon-si (KR); Sam Yong Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 72 days.

(21) Appl. No.: 15/193,979

(22) Filed: Jun. 27, 2016

(65) Prior Publication Data
US 2017/0158055 A1 Jun. 8, 2017

(30) Foreign Application Priority Data
Dec. 3, 2015 (KR) .......................... 10-2015-0171699

(51) Int. Cl.
B62D 15/02 (2006.01)
B60Q 1/00 (2006.01)
B60K 37/06 (2006.01)

(52) U.S. Cl.
CPC ............ B62D 15/021 (2013.01); B60K 37/06 (2013.01); B60Q 1/0082 (2013.01); B60K 2350/1024 (2013.01); B60K 2350/1036 (2013.01); B60K 2350/928 (2013.01)

(58) Field of Classification Search
CPC ..... B62D 15/021; B60K 37/06; B60Q 1/0082
See application file for complete search history.

(56) References Cited

U.S. PATENT DOCUMENTS

| | | | | |
|---|---|---|---|---|
| 5,365,440 A | * | 11/1994 | Abe | ..................... B62D 7/1581 180/408 |
| 2003/0222858 A1 | * | 12/2003 | Kobayashi | ............ G06F 3/0418 345/173 |
| 2009/0189373 A1 | * | 7/2009 | Schramm | ............... B60K 35/00 280/731 |
| 2011/0241850 A1 | | 10/2011 | Bosch et al. | |
| 2012/0283894 A1 | * | 11/2012 | Naboulsi | ............. B60R 11/0264 701/1 |

(Continued)

FOREIGN PATENT DOCUMENTS

| | | |
|---|---|---|
| JP | 2010-083203 A | 4/2010 |
| JP | 2011-213343 A | 10/2011 |

(Continued)

OTHER PUBLICATIONS

Korean Office Action dated Dec. 1, 2016, issued in Korean Patent Application No. 10-2015-0171699.

*Primary Examiner* — Calvin Cheung
(74) *Attorney, Agent, or Firm* — McDermott Will & Emery LLP

(57) ABSTRACT

An apparatus for manipulating in-vehicle devices using a steering wheel includes a reference signal input unit for inputting a reference signal to a driver through a charged plate, a touch sensor for receiving the reference signal through human body communication and for detecting a touch of the driver, and a controller for generating a control signal on the basis of the results detected by the touch sensor.

12 Claims, 4 Drawing Sheets

(56) References Cited

U.S. PATENT DOCUMENTS

| | | | |
|---|---|---|---|
| 2013/0060414 A1* | 3/2013 | Lee | B62D 1/286 |
| | | | 701/23 |
| 2014/0111422 A1* | 4/2014 | Chow | G06F 3/0482 |
| | | | 345/156 |
| 2014/0148988 A1* | 5/2014 | Lathrop | B60W 50/10 |
| | | | 701/23 |
| 2014/0267688 A1* | 9/2014 | Aich | H04N 7/181 |
| | | | 348/113 |
| 2014/0309870 A1* | 10/2014 | Ricci | H04W 48/04 |
| | | | 701/36 |
| 2015/0192426 A1* | 7/2015 | Foster | G01C 21/3629 |
| | | | 715/765 |
| 2015/0198949 A1* | 7/2015 | Boos | G05D 1/0044 |
| | | | 701/2 |
| 2016/0162145 A1* | 6/2016 | Rivers | G01S 13/9307 |
| | | | 715/769 |
| 2017/0036695 A1* | 2/2017 | Lee | B62D 15/0285 |
| 2017/0060234 A1* | 3/2017 | Sung | B60R 1/006 |
| 2017/0190335 A1* | 7/2017 | Gillett | B60W 50/082 |
| 2017/0291493 A1* | 10/2017 | Bostick | B60K 35/00 |
| 2017/0308075 A1* | 10/2017 | Whitaker | B60W 10/04 |

FOREIGN PATENT DOCUMENTS

| | | |
|---|---|---|
| KR | 10-2011-0058460 A | 6/2011 |
| KR | 10-2011-0127978 A | 11/2011 |
| KR | 10-2015-0057530 A | 5/2015 |
| KR | 10-1525203 B1 | 6/2015 |
| WO | 2012/141131 A1 | 10/2012 |
| WO | 2015/119285 A1 | 8/2015 |

* cited by examiner

APPARATUS AND METHOD FOR MANIPULATING IN-VEHICLE DEVICES USING STEERING WHEEL

CROSS-REFERENCE TO RELATED APPLICATION

This application claims the benefit of priority to Korean Patent Application No. 10-2015-0171699, filed on Dec. 3, 2015 with the Korean Intellectual Property Office, the disclosure of which is incorporated herein in its entirety by reference.

TECHNICAL FIELD

The present disclosure relates to an apparatus and a method for manipulating in-vehicle devices using a steering wheel and, more particularly, to an apparatus and a method for manipulating in-vehicle devices by detecting a touch pattern of a driver through a plurality of sensors mounted on a rim of a steering wheel and generating a control signal corresponding thereto.

BACKGROUND

In general, a steering wheel is a device that is manipulated by a driver so as to change a direction of travel of a vehicle, and typically includes an outer rim, a central hub, and spokes connecting the rim to the hub.

Conventionally, an apparatus for manipulating in-vehicle devices using a steering wheel includes: an electrostatic sensor having a dielectric layer formed on an upper surface of a spoke of a steering wheel and one or more electrodes stacked on edge portions of an upper surface of the dielectric layer; a signal analyzer for analyzing a signal generated by the electrostatic sensor; and a control signal generator for generating a control signal for in-vehicle devices using the analyzed signal. The apparatus may recognize a drag operation applied to the upper surface of the spoke or touch operations repeated at certain times and control in-vehicle devices on the basis of the recognized operations.

In such a conventional apparatus for manipulating in-vehicle devices using a steering wheel, the electrostatic sensor that senses a touch of a driver may be disposed on the upper surface of the spoke of the steering wheel, such that the driver may have difficulty in removing his or her hands from the rim of the steering wheel in order to manipulate devices.

In addition, the conventional apparatus for manipulating in-vehicle devices using a steering wheel may control in-vehicle, or other, devices such as turn signal lights, emergency lights, wipers, audio volume, and the like, but does not provide a graphic interface control function, such as the ability to move a cursor and select an icon on a display screen.

SUMMARY

The present disclosure has been made to solve the above-mentioned problems occurring in the prior art while advantages achieved by the prior art are maintained intact.

An aspect of the present disclosure provides an apparatus and a method for manipulating in-vehicle devices using a steering wheel, in which a plurality of sensors that detects a touch of a driver is provided on a rim of the steering wheel, such that it is determined whether the touch of the driver is intended for steering or manipulating, and when the touch of the driver is intended for manipulating, a control signal with respect to a corresponding touch pattern is generated, such that the driver can manipulate in-vehicle devices without removing his or her hands from the rim of the steering wheel.

The objects of the present disclosure are not limited to the foregoing objects, and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by elements claimed in the claims and a combination thereof.

According to an aspect of the present disclosure, an apparatus for manipulating in-vehicle devices using a steering wheel includes: a reference signal input unit inputting a reference signal to a driver through a charged plate; a touch sensor receiving the reference signal through human body communication and detecting a touch of the driver; and a controller generating a control signal on the basis of the results detected by the touch sensor.

According to another aspect of the present disclosure, an apparatus for manipulating in-vehicle devices using a steering wheel includes: a storage storing a table in which steering angle ranges according to vehicle speed are recorded; a steering angle sensor detecting a steering angle of the steering wheel; a vehicle speed sensor detecting a vehicle speed; a touch sensor detecting a touch of a driver; and a controller determining that the touch of the driver is intended for manipulating when the steering angle detected by the steering angle sensor is within a steering angle range corresponding to the vehicle speed detected by the vehicle speed sensor on the basis of the table stored in the storage, analyzing a touch pattern of the driver, and generating a control signal corresponding thereto.

According to another aspect of the present disclosure, a method for manipulating in-vehicle devices using a steering wheel includes: inputting, by a reference signal input unit, a reference signal to a driver through a charged plate; receiving, by a touch sensor, the reference signal through human body communication to detect a touch of the driver; and generating, by a controller, a control signal on the basis of the results detected by the touch sensor.

According to another aspect of the present disclosure, a method for manipulating in-vehicle devices using a steering wheel includes: storing, by a storage, a table in which steering angle ranges according to vehicle speed are recorded; detecting, by a touch sensor, a touch of a driver; detecting, by a steering angle sensor, a steering angle of the steering wheel; detecting, by a vehicle speed sensor, a vehicle speed; determining, by a controller, whether or not the detected steering angle is within a steering angle range corresponding to the detected vehicle speed; determining that the touch of the driver is intended for manipulating when the detected steering angle is within the steering angle range, analyzing a touch pattern of the driver, and generating a control signal corresponding thereto; and determining that the touch of the driver is intended for steering unless the detected steering angle is within the steering angle range.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above and other objects, features and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the concepts of the present disclosure. Hereinafter, exemplary embodiments of the present disclosure will be described in detail with reference to the accompanying drawings.

Figure 1:
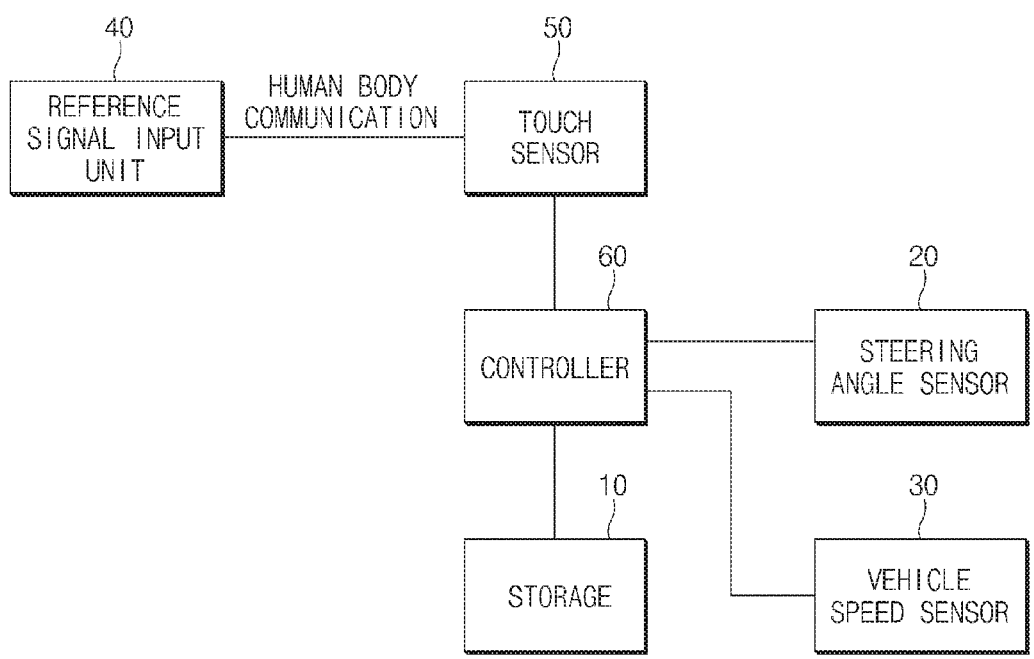
FIG. 1 illustrates a configuration of an apparatus for manipulating in-vehicle devices using a steering wheel according to an exemplary embodiment of the present disclosure.

FIG. 1 illustrates a configuration of an apparatus for manipulating in-vehicle devices using a steering wheel, according to an exemplary embodiment of the present disclosure.

As illustrated in FIG. 1, the apparatus for manipulating in-vehicle devices using a steering wheel, according to an exemplary embodiment of the present disclosure, may include a storage 10, a steering angle sensor 20, a vehicle speed sensor 30, a reference signal input unit 40, a touch sensor 50 and a controller 60.

With respect to each of the aforementioned elements, first, the storage 10 may store a table in which steering angle ranges according to vehicle speed are recorded. When a touch of a driver is detected, the table may be used by the controller 60 to determine whether the touch is intended for steering or manipulating. Here, as the vehicle speed is increased, the touch needs to be recognized for steering even with respect to a low steering angle. Thus, the table may, include, for example, variations in steering angle ranges according to vehicle speed, as shown in the following table 1:

TABLE 1

| | Vehicle Speed | Steering Angle |
|---|---|---|
| High Speed | 80 kph or higher | 0-2° |
| Medium Speed | 30 kph to 80 kph (lower than 80 kph, but above 30 kph) | 0-3° |
| Low Speed | lower than 30 kph | 0-5° |

In table 1, unless the steering angle exceeds 2° while the vehicle travels at high speed, it may be determined that the touch of the driver is not intended for steering. Unless the steering angle exceeds 3° while the vehicle travels at medium speed, it may be determined that the touch of the driver is not intended for steering. Unless the steering angle exceeds 5° while the vehicle travels at low speed, it may be determined that the touch of the driver is not intended for steering.

In other words, unless the steering angle exceeds 2° while the vehicle travels at high speed, it may be determined that the touch of the driver is intended for manipulating. Unless the steering angle exceeds 3° while the vehicle travels at medium speed, it may be determined that the touch of the driver is intended for manipulating. Unless the steering angle exceeds 5° while the vehicle travels at low speed, it may be determined that the touch of the driver is intended for manipulating.

The steering angle sensor 20 may detect a steering angle through the manipulation of the steering wheel.

The vehicle speed sensor 30 may detect a vehicle speed.

The reference signal input unit 40 may input a reference signal used when the touch sensor 50 detects the touch of the driver. Here, the reference signal may be a signal having a particular frequency.

Hereinafter, human body communication between the reference signal input unit 40 and the touch sensor 50 will be described with reference to FIG. 2.

Figure 2:
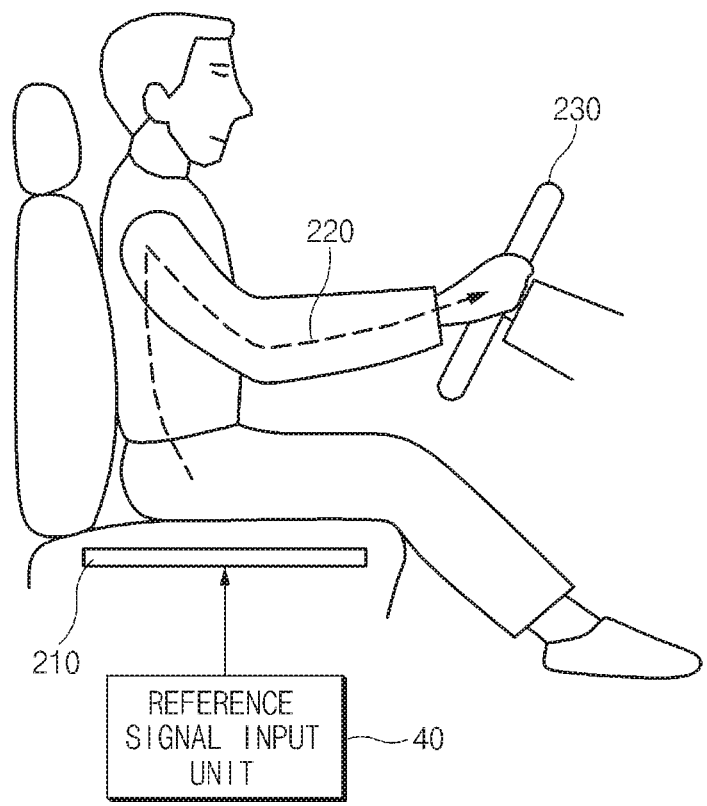
FIG. 2 illustrates a process of detecting a touch of a driver through human body communication according to an exemplary embodiment of the present disclosure.

FIG. 2 illustrates a process of detecting a touch of a driver through human body communication, according to an exemplary embodiment of the present disclosure.

In FIG. 2, 211 denotes a charged plate that may input a reference signal from the reference signal input unit 40 to a human body. Here, the charged plate 211 may input the reference signal to the human body when it is positioned within a predetermined distance from the driver, irrespective of contact or non-contact with the driver. For example, the charged plate 211 may be positioned in the interior of a driver's seat.

Next, the reference signal input through the charged plate 211 may be transferred to a steering wheel 230 through the human body. Here, 220 denotes a path through which the reference signal is transferred through the human body.

Figure 3:
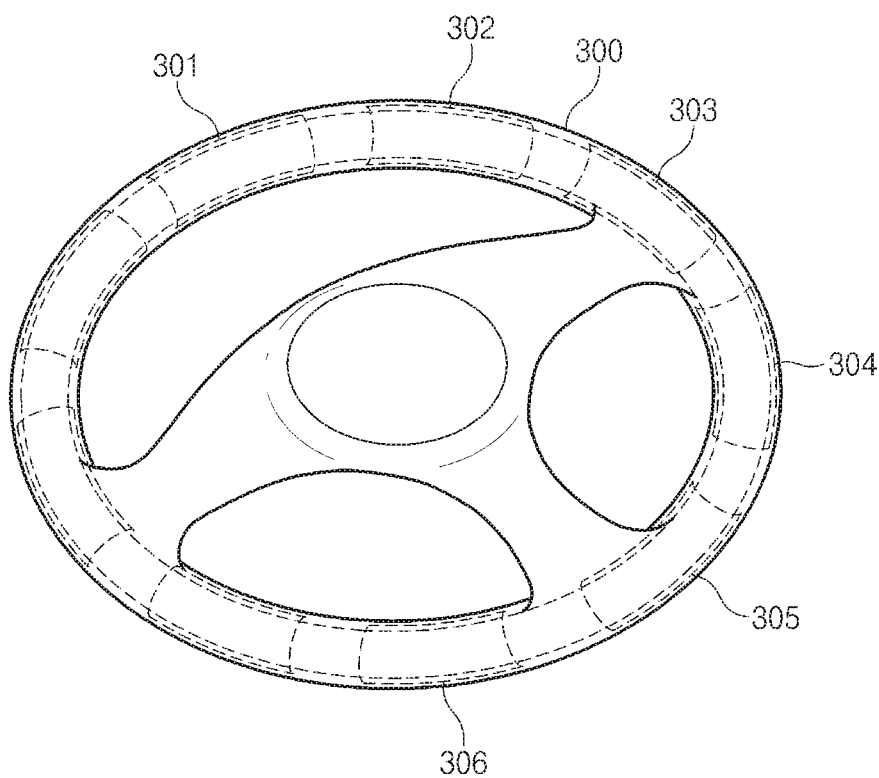
FIG. 3 illustrates a structure of a touch sensor, according to an exemplary embodiment of the present disclosure.

Then, the touch sensor 50 may be a sensor module that detects the touch of the driver. As illustrated in FIG. 3, the touch sensor 50 may include a plurality of sensors, and may allow the controller 60 to recognize a touch pattern of the driver.

Hereinafter, the touch sensor 50 will be detailed with reference to FIG. 3.

FIG. 3 illustrates a structure of a touch sensor, according to an exemplary embodiment of the present disclosure.

As illustrated in FIG. 3, the touch sensor 50 may include a plurality of sensors mounted on the steering wheel of the vehicle. For example, the touch sensor 50 may include a first sensor 301, a second sensor 302, a third sensor 303, a fourth sensor 304, a fifth sensor 305 and a sixth sensor 306. Here, even when the steering wheel is covered with a cover 300 made of a leather material, there may be no effect on the detection of touches by respective sensors. For example, each of the sensors may be a capacitive coupling sensor.

The controller 60 generally may control the aforementioned respective elements to perform the functions thereof normally.

In particular, when a touch of a driver is detected by the touch sensor 50, the controller 60 may determine whether the touch of the driver is intended for steering or manipulating. For example, the controller 60 may determine whether the touch of the driver is intended for steering or manipulating by using a steering angle detected by the steering angle sensor 20 and a vehicle speed detected by the vehicle speed sensor 30 on the basis of the table stored in the storage 10.

In other words, the controller 60 may determine that the touch of the driver is intended for manipulating when the steering angle detected by the steering angle sensor 20 is within a steering angle range corresponding to the vehicle speed detected by the vehicle speed sensor 30 on the basis of the table stored in the storage 10.

Then, the controller 60 may analyze a touch pattern of the driver when the touch of the driver is determined to be intended for manipulating, and may generate a control signal corresponding thereto.

For example, when an in-vehicle device to be manipulated is an audio video navigation (AVN), touch patterns of the driver for the start and end of manipulation, the movement of a cursor on a display screen, the selection of an icon on the display screen, and the like, are as follows:

1) Start and End of Manipulation the first sensor→the second sensor→the first sensor Here, "start" may indicate that the pattern is initially started, and "end" may indicate that the pattern is implemented again.

2) Movement of Cursor to the Right on Display Screen the first sensor→the second sensor→the third sensor→the fourth sensor (temporarily detect touch)

3) Continuous Movement of Cursor to the Right on Display Screen the first sensor→the second sensor→the third sensor→the fourth sensor (continuously detect touch)

4) Movement of Cursor to the Left on Display Screen the fifth sensor→the fourth sensor→the third sensor→the second sensor (temporarily detect touch)

5) Continuous Movement of Cursor to the Left on Display Screen the fifth sensor→the fourth sensor→the third sensor→the second sensor (continuously detect touch)

6) Selection of Icon on Display Screen

An n-th sensor detects second consecutive touches.

Here, n may be any one of 1 to 6.

Meanwhile, the controller 60 may perform a filtering operation for removing noise from a reference signal detected by each of the sensors within the touch sensor 50.

In addition, the touch sensor 50 may be, for example, a notch filter.

Figure 4:
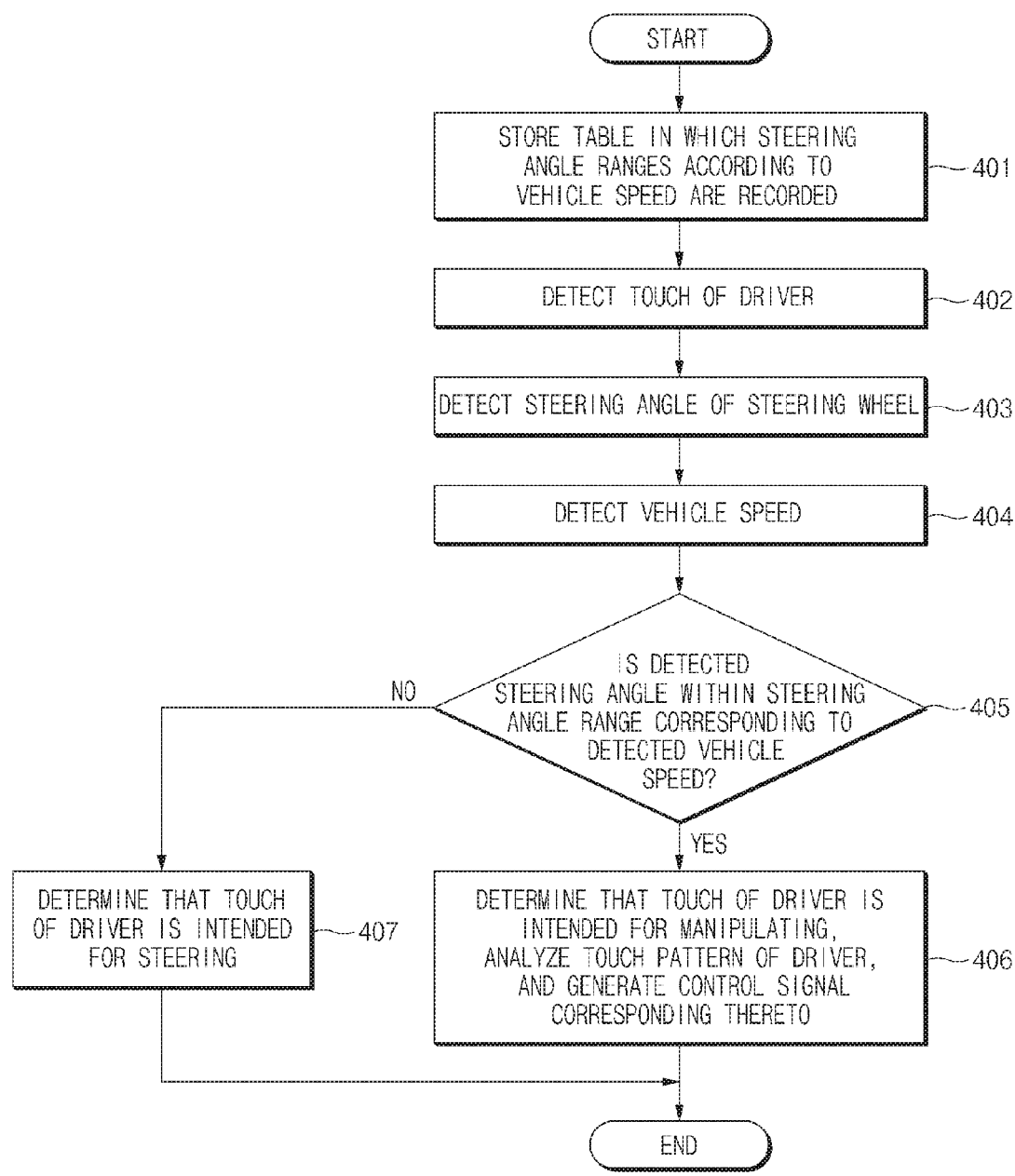
FIG. 4 illustrates a flowchart of a method for manipulating in-vehicle devices using a steering wheel, according to an exemplary embodiment of the present disclosure.

FIG. 4 illustrates a flowchart of a method for manipulating in-vehicle devices using a steering wheel, according to an exemplary embodiment of the present disclosure.

First, the storage 10 may store a table in which steering angle ranges according to vehicle speed are recorded in operation 401.

Next, the touch sensor 50 may detect a touch of a driver in operation 402.

The steering angle sensor 20 may detect a steering angle of the steering wheel in operation 403.

The vehicle speed sensor 30 may detect a vehicle speed in operation 404.

Thereafter, the controller 60 may determine whether or not the steering angle detected by the steering angle sensor 20 is within a steering angle range corresponding to the vehicle speed detected by the vehicle speed sensor 30 in operation 405.

As a result of operation 405, when the steering angle is within the steering angle range corresponding to the vehicle speed, the controller 60 may determine that the touch of the driver is intended for manipulating, analyze a touch pattern of the driver, and generate a control signal corresponding thereto in operation 406.

As a result of operation 405, unless the steering angle is within the steering angle range corresponding to the vehicle speed, the controller 60 may determine that the touch of the driver is intended for steering in operation 407.

Throughout these operations, the driver may manipulate in-vehicle devices without removing his or her hands from the rim of the steering wheel.

The above-stated method according to an exemplary embodiment of the present disclosure may be written as a computer program. Codes and code segments constituting the program may easily be inferred by a computer programmer skilled in the art. In addition, the written program may be stored in a computer-readable recording medium (an information storage medium) and may be read and executed by a computer, thereby implementing the method according to an exemplary embodiment of the present disclosure. The recording medium may include all types of computer-readable recording media.

As set forth above, a plurality of sensors that detects a touch of a driver may be provided on the rim of the steering wheel, such that it may be determined whether the touch of the driver is intended for steering or manipulating, and when the touch of the driver is intended for manipulating, a control signal with respect to a corresponding touch pattern may be generated, such that the driver can manipulate in-vehicle devices without removing his or her hands from the rim of the steering wheel.

In addition, it may be determined whether the touch of the driver is intended for steering or manipulating on the basis of the results detected by the steering angle sensor and the vehicle speed sensor.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for manipulating in-vehicle devices using a steering wheel, the apparatus comprising:
   a storage for storing a table in which steering angle ranges according to vehicle speed are recorded;
   a steering angle sensor for detecting a steering angle of the steering wheel;
   a vehicle speed sensor for detecting a vehicle speed;
   a touch sensor for detecting a touch of a driver; and
   a controller for determining that the touch of the driver is intended for manipulating when the steering angle detected by the steering angle sensor is within a steering angle range corresponding to the vehicle speed detected by the vehicle speed sensor on the basis of the table stored in the storage, analyzing a touch pattern of the driver, and generating a control signal corresponding thereto.

2. The apparatus according to claim 1, wherein, in the table, as the vehicle speed is increased, the steering angle ranges are narrowed.

3. The apparatus according to claim 1, wherein the touch sensor includes a plurality of sensors mounted on the steering wheel.

4. The apparatus according to claim 1, further comprising a reference signal input unit for inputting a reference signal to the driver through a charged plate.

5. The apparatus according to claim 4, wherein the touch sensor receives the reference signal through human body communication to detect the touch of the driver.

6. The apparatus according to claim 5, wherein the controller performs a filtering operation for removing noise from the reference signal received by the touch sensor.

7. The apparatus according to claim 3, wherein the plurality of sensors is provided as a capacitive coupling sensor.

8. A method for manipulating in-vehicle devices using a steering wheel, the method comprising:
- storing, by a storage, a table in which steering angle ranges according to vehicle speed are recorded;
- detecting, by a touch sensor, a touch of a driver;
- detecting, by a steering angle sensor, a steering angle of the steering wheel;
- detecting, by a vehicle speed sensor, a vehicle speed;
- determining, by a controller, whether or not the detected steering angle is within a steering angle range corresponding to the detected vehicle speed;
- determining that the touch of the driver is intended for manipulating when the detected steering angle is within the steering angle range, analyzing a touch pattern of the driver, and generating a control signal corresponding thereto; and
- determining that the touch of the driver is intended for steering unless the detected steering angle is within the steering angle range.

9. The method according to claim 8, wherein, in the table, as the vehicle speed is increased, the steering angle ranges are narrowed.

10. The method according to claim 8, wherein, in the detecting of the touch of the driver, the touch of the driver is detected by using a plurality of sensors mounted on the steering wheel.

11. The method according to claim 8, wherein, in the detecting of the touch of the driver, when a reference signal is input to the driver through a charged plate, the reference signal is received through human body communication to detect the touch of the driver.

12. The method according to claim 11, further comprising filtering for removal of noise from the received reference signal.

* * * * *